United States Patent Office 2,886,607
Patented May 12, 1959

2,886,607

FLUORINATION OF TELOMERS

Robert H. Wade, West Paterson, and William S. Barnhart, Cranford, N.J., assignors, by mesne assignments, to Minnesota Mining and Manufacturing Company, St. Paul, Minn., a corporation of Delaware No Drawing. Application April 28, 1955
Serial No. 504,682

10 Claims. (Cl. 260—653.5)

This invention relates to a process for producing novel fluorinated derivatives of telomers of polymerizable halogenated ethylenically unsaturated compounds.

The telomers which are fluorinated, in accordance with the present invention, are those produced by the telomerization of perchlorofluoroolefins such as chlorotrifluoroethylene, perfluoroolefins such as tetrafluoroethylene, chloroolefins such as vinyl chloride, and fluoroolefins such as vinylidene fluoride. Other ethylenically unsaturated compounds, the telomers of which may be used, are perfluorobutadiene, alpha-methylphenyldifluoroethylene, dichlorodifluoroethylene, perfluoroacrylonitrile, perfluorocyclobutene, alpha-chlorostyrene, 2-chloropropene, vinylidene chloride, vinyl bromide, tetrachloropropene, chlorobutadiene, alpha-bromostyrene, bromotrifluoroethylene, trifluoroethylene, fluoroprene, 1,1,2-trifluorobutadiene, 1,1-difluorobutadiene, 1,1,3-trifluorobutadiene, and 1,1,2,4,4-pentafluorobutadiene. Cotelomers of the foregoing monomers, as well as homotelomers thereof, may be used to form the fluorinated derivatives of the invention, and the cotelomers may be, for example, the cotelomerization product of chlorotrifluoroethylene and tetrafluoroethylene. Where cotelomers are used, the comonomer is preferably a halogenated olefin in which the halogen atoms are fluorine and/or chlorine.

The telogens which may be used to form the telomers may be sulfuryl halides such as sulfuryl bromide, sulfuryl chloride, sulfuryl fluorochloride, and sulfuryl bromochloride, and of these, sulfuryl chloride is preferred. Other telogens which may be used are compounds such as chloroform, carbon tetrachloride, tribromomethane, bromotrichloromethane, dibromodifluoromethane, 1-bromo-1,1-dichloro-2,2-difluoroethane, and bromodichlorotrifluoroethane. In general, any halogenated alkane may be used as a telogen provided it has no more than one hydrogen atom on any one carbon atom, and the halogenated methanes are preferred.

The telomers which are fluorinated in accordance with the present invention may be prepared by telomerizing a polymerizable halogenated ethylenically unsaturated monomer using a telogen such as sulfuryl chloride in the presence of a catalyst to produce a substantially saturated telomer. The telogen provides halogen terminal groups, tends to control telomerization, and terminates free radical reactions so that by varying the amount of telogen used, the telomeric material may be obtained primarily as a liquid, oil, grease, or wax, which is recovered as the telomerization product. One method of preparing telomers of this type, using sulfuryl halide telogens, is disclosed in copending application Serial No. 294,495, filed June 9, 1952, now Patent No. 2,770,659. A variation of the process disclosed and claimed in this copending application, in which sulfur dioxide is used as a modifying agent, is disclosed in copending application Serial No. 342,743, filed March 16, 1953, now Patent No. 2,837,580.

Generally speaking, the telomers which are fluorinated in accordance with the process of the present invention are those having the formula R(M)$_n$B in which R is fluorine, chlorine, bromine, or a haloalkyl radical having not in excess of one hydrogen atom per carbon atom, R preferably being chlorine or a methyl radical having three halogen atoms, M is a polymerizable halogenated ethylenically unsaturated monomer unit having not more than about 8 carbon atoms, such as chlorotrifluoroethylene or tetrafluoroethylene, n is an integer from 2 to 20, and B is bromine, chlorine or hydrogen.

The fluorinating agents used are inorganic fluorinating agents in which the metal is preferably present in its highest valence state, such fluorinating agents including cobalt trifluoride, mercuric fluoride, silver fluoride, antimonous fluoride in combination with antimony pentachloride, and the like. Of these fluorinating agents cobalt trifluoride is preferred.

The novel fluorinated derivatives of the invention are lower boiling and more highly fluorinated compounds than the initial telomer, and they are produced by treating the telomer with an inorganic fluorinating agent such as one of those aforementioned. A mixture of telomer and fluorinating agent is agitated for a period of between about 3 and 48 hours, preferably between 5 and 24 hours, at a temperature in the range of between about 100 and 300° C., preferably between about 130 and about 250° C. When antimonous fluoride is used as the fluorinating agent, the crude product is washed with hydrogen chloride and water, and if other fluorinating agents are used, a water wash alone is sufficient. The product is then dried and distilled or redistilled, depending upon the apparatus used and the particular telomer which is reacted.

If the telomer boils at or about the reaction temperature, the fluorination is carried out in a flask or similar vessel connected to a distillation column and head from which the low boiling product is removed as soon as it is formed in order to maintain the reaction temperature in the desired range and to insure the continuance of the fluorination reaction. The reaction may also be effected in a flask, and the crude product may be separated from the insoluble fluorinating agent by filtration. Alternatively, the crude product may be steam distilled from the reaction mixture.

If the telomer boils below the reaction temperature, the fluorination may be carried out in a bomb or autoclave under autogenous pressures which are generally in the range of 500 to 1000 p.s.i.g. When this method is used, somewhat shorter reaction periods and temperatures in the range of about 200° to 300° C. may be used.

Another method of fluorination consists of passing vaporized telomer over a hot inorganic fluorinating agent. The crude product is condensed in a cold trap and collected. This method is useful if it is desired to react a telomer at a temperature above its boiling point. In each case the crude product is washed with water, or water and hydrogen chloride, dried and distilled to produce a pure product.

The fluorinated telomer products are useful as hydraulic fluids, transformer oils, plasticizers, rubber softeners, heat transfer media, dielectric fluids, potting compounds, and chemical intermediates.

Some of these fluorinated derivatives may be used to prepare olefins by dehalogenation using a conventional dehalogenating agent, such as zinc dust, sodium amalgam, copper powder, powdered tin, and the like. The molar concentration ratio of saturated fluorinated telomer to dehalogenating agent may be in the range of between about 1:1 and about 1:5, preferably between about 1:1.5 and 1:2.5. The fluorinated telomer and the dehalogenating agent are mixed in the presence of a solvent, such as water, alcohol, dioxane, pyridine, and the like and heated to boiling in a flask equipped with a reflux condenser. The low boiling crude olefinic product is removed, washed, and redistilled to produce a pure perchlorofluoromonocarboxylic compound.

The olefins produced by this method are useful as monomers and comonomers, chemical intermediates, drying oils, coatings, and fumigants.

The invention will be further illustrated by reference to the following specific examples:

EXAMPLE 1

*Reaction of $Cl(CF_2-CFCl)_2Cl$ with $SbF_3$ and $SbCl_5$*

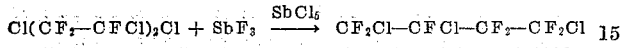

$Cl(CF_2-CFCl)_2Cl$, 152 grams (0.5 mole), and $SbF_3$, 89.5 grams (0.5 mole), were placed in a 500 ml. three-necked flask fitted with a dropping funnel, stirrer, and Vigreux column equipped with a head and a cooled receiver. $SbCl_5$ (0.25 mole) was placed in the dropping funnel and added slowly as the reaction mixture was heated with stirring to reflux in the head. The head temperature remained at 133° C. An additional 0.5 mole of $SbCl_5$ was slowly added, and the reflux temperature slowly dropped to 118° C. Some material was taken off slowly. After about 15 hours the remainder of the product was distilled and the distillate was washed with 10 percent hydrochloric acid and 5 percent sodium bicarbonate and then dried and fractionated. The various fractions taken off are as follows:

| Fraction | Weight (grams) | Specific Gravity | $n_D{}^{20}$ | MR |
|---|---|---|---|---|
| (1) 101–104° C | 22.92 | 1.716 | 1.3500 | 35.9 |
| (2) –107° C | 5.57 | 1.718 | 1.3522 | 36.2 |
| (3) –131.3° C | 15.77 | 1.720 | 1.3610 | |
| (4) –133.7° C | 51.30 | 1.750 | 1.3792 | |
| (5) –134° C | 22.22 | 1.740 | 1.3780 | |

Fractions 1 and 2 show a 20 percent conversion to $C_4Cl_3F_7$ or a 52 percent yield of product.

EXAMPLE 2

*Reaction of $Cl(CF_2-CFCl)_2Cl$ with $CoF_3$*

A mixture of $Cl(CF_2-CFCl)_2Cl$, 122 grams (0.4 mole), and $CoF_3$, 93 grams (0.8 mole), was placed in a steel bomb and heated with rocking to a temperature of 250° C. for a period of 5 hours. A total of 176.4 grams of solid and liquid was recovered. The liquid was steam distilled, dried, and fractionated. A fraction boiling in the range of 97 to 99° C. and weighing 56 grams was collected. This fraction represents a 49 percent yield of the product $CF_2Cl-CFCl-CF_2-CF_2Cl$. $n_D{}^{20}=1.3446$. Redistilled fraction: B.P. 96 to 98° C. $n_D{}^{20}=1.3464$, $d_4{}^{20}=1.704$, M.R. calc., 35.58; found, 35.85.

EXAMPLE 3

*Reaction of $CCl_3(CF_2-CFCl)_2Br$ with $CoF_3$*

A mixture of $CCl_3(CF_2-CFCl)_2Br$, 215 grams (0.5 mole, B.P. 120° C./20 mm.) and $CoF_3$, 58 grams (0.5 mole), is placed in a steel bomb and heated with rocking to a temperature of 225° C. for a period of 4 hours. After reaction, the product is filtered, washed with water, dried and distilled. A fraction boiling below 120° C. at a pressure of 20 mm. of mercury and weighing about 87 grams is obtained. This represents a substantial conversion to fluorinated products.

EXAMPLE 4

*Reaction of $CHF_2-CCl_2(CF_2-CFCl)_2Br$ with $CoF_3$*

A mixture of $CHF_2-CCl_2(CF_2-CFCl)_2Br$ (111.7 grams; 0.25 mole) and $CoF_3$ (29 grams; 0.25 mole) is charged to a steel bomb and heated with rocking to a temperature of 225° C. for a period of 4 hours. After reaction, the product is filtered, washed with water, dried and distilled. A fraction boiling below 120° C. at a pressure of 20 mm. of mercury and weighing about 87 grams is obtained. This represents a substantial conversion to fluorinated products.

EXAMPLE 5

*Dehalogenation of $CF_2Cl-CFCl-CF_2-CF_2Cl$*

A mixture of 100 grams (0.35 mole) of $$CF_2Cl-CFCl-CF_2-CF_2Cl$$

68 grams of zinc dust, 100 ml. of absolute methanol, and 10 drops of concentrated hydrochloric acid was charged to an Aminco bomb, cooled in liquid nitrogen, evacuated, sealed, and heated to a temperature of 125° C. for 7.5 hours with rocking. The liquid product was distilled and a fraction boiling in the temperature range of 29 to 35° C. weighing 21.45 grams was collected. This fraction represents a 28.5 percent conversion and a 55 percent yield of $CF_2=CF-CF_2-CF_2Cl$ $n_D{}^{20}=1.299$. Specific gravity, 1.570 (6° C.). Molar refractivity, 25.6.

It will be obvious to those skilled in the art that many modifications may be made within the scope of the present invention without departing from the spirit thereof, and the invention includes all such modifications.

We claim:

1. A process which comprises treating with a fluorinating agent a compound having the formula $$Cl(M)_nCl$$

in which M is a polymerizable perhalogenated ethylenically unsaturated monomer unit having not in excess of about 8 carbon atoms and $n$ is an integer from 2 to 20 wherein at least one of said terminal chlorine atoms is replaced with a fluorine atom.

2. A process which comprises treating with a fluorinating agent a compound having the formula $$Cl(CF_2-CFCl)_nCl$$

in which $n$ is an integer from 2 to 20 wherein at least one of said terminal chlorine atoms is replaced with a fluorine atom.

3. A process which comprises treating with a fluorinating agent a compound having the formula $$Cl(CF_2-CF_2)_nCl$$

in which $n$ is an integer from 2 to 20 wherein at least one of said terminal chlorine atoms is replaced with a fluorine atom.

4. A process according to claim 1 in which the fluorinating agent is selected from the group consisting of cobalt trifluoride, mercuric fluoride, silver fluoride, and antimonous fluoride.

5. A process according to claim 2 in which the fluorinating agent is selected from the group consisting of cobalt trifluoride, mercuric fluoride, silver fluoride, and antimonous fluoride.

6. A process according to claim 3 in which the fluorinating agent is selected from the group consisting of cobalt trifluoride, mercuric fluoride, silver fluoride, and antimonous fluoride.

7. A process which comprises treating with a fluorinating agent a compound having the formula $$Cl(M)_nCl$$

in which M is a polymerizable halogented ethylenically unsaturated monomer unit and $n$ is an integer from 2 to 20 wherein at least one of said terminal chlorine atoms is replaced with a fluorine atom, and dehalogenting the product to form an unsaturated compound.

8. A process which comprises treating with a fluorinating agent a compound having the formula $$Cl(M)_nCl$$

in which M is a polymerizable halogenated ethylenically unsaturated monomer unit having not in excess of about 8 carbon atoms and $n$ is an integer from 2 to 20 wherein at least one of said terminal chlorine atoms is replaced with a fluorine atom, and dehalogenating the product to form an unsaturated compound.

9. A process which comprises treating with a fluorinating agent a compound having the formula $$Cl(CF_2\text{---}CFCl)_nCl$$

in which $n$ is an integer from 2 to 20 wherein at least one of said terminal chlorine atoms is replaced with a fluorine atom, and dehalogenating the product to form an unsaturated compound.

10. A process which comprises treating with a fluorinating agent a compound having the formula $$Cl(CF_2\text{---}CF_2)_nCl$$

in which $n$ is an integer from 2 to 20 wherein at least one of said chlorine atoms is replaced with a fluorine atom, and dehalogenating the product to form an unsaturated compound.

References Cited in the file of this patent

UNITED STATES PATENTS

| | | |
|---|---|---|
| 2,598,411 | Miller et al. | May 27, 1952 |
| 2,636,908 | Dittman et al. | Apr. 28, 1953 |
| 2,700,661 | Miller | Jan. 25, 1955 |
| 2,716,141 | Miller | Aug. 23, 1955 |